United States Patent

Thomson et al.

[11] Patent Number: 5,899,678
[45] Date of Patent: May 4, 1999

[54] OXIDATION AND/OR COMBUSTION CATALYST FOR USE IN A CATALYTIC EXHAUST SYSTEM AND PROCESS FOR ITS PREPARATION

[75] Inventors: James Thomson; James Cairns, both of Dundee; Andrew Hourd, Tayside, all of United Kingdom

[73] Assignee: University Court of the University of Dundee, Dundee, United Kingdom

[21] Appl. No.: 08/875,765

[22] PCT Filed: Feb. 2, 1996

[86] PCT No.: PCT/GB96/00239

§ 371 Date: Jan. 9, 1998

§ 102(e) Date: Jan. 9, 1998

[87] PCT Pub. No.: WO96/23573

PCT Pub. Date: Aug. 8, 1996

[30] Foreign Application Priority Data

Feb. 2, 1995 [GB] United Kingdom ............... 9502058.2
Sep. 15, 1995 [GB] United Kingdom ............... 9518948.6

[51] Int. Cl.$^6$ .............................. B01J 23/00; B01J 37/00; F01N 3/20; F23C 11/00
[52] U.S. Cl. .................... 431/2; 423/213.2; 423/213.5; 423/245.3; 422/177; 422/180; 502/300; 502/325; 502/326; 502/302; 502/343; 502/500; 502/514
[58] Field of Search ..................... 60/299; 422/177, 422/180; 423/213.2, 213.5, 245.3; 502/300, 325, 326, 500, 514, 302, 343; 431/7, 2

[56] References Cited

U.S. PATENT DOCUMENTS

| | | | |
|---|---|---|---|
| 3,867,312 | 2/1975 | Stephens | 252/462 |
| 4,233,185 | 11/1980 | Knapton et al. | 252/462 |
| 4,294,726 | 10/1981 | Bozon et al. | 252/462 |
| 4,492,769 | 1/1985 | Blanchard et al. | 502/262 |
| 5,045,521 | 9/1991 | Lox et al. | 502/304 |
| 5,332,554 | 7/1994 | Yasaki et al. | 422/180 |

FOREIGN PATENT DOCUMENTS

| | | |
|---|---|---|
| 0 397 411 A2 | 11/1990 | European Pat. Off. . |
| 0 397 411 A3 | 11/1990 | European Pat. Off. . |
| 0397411 A2 | 11/1990 | European Pat. Off. . |
| 0 449 423 A1 | 10/1991 | European Pat. Off. . |
| 0449423 A1 | 10/1991 | European Pat. Off. . |
| 0 645 171 A1 | 3/1995 | European Pat. Off. . |
| 0645171 A1 | 3/1995 | European Pat. Off. . |
| 2276332 A | 9/1994 | Germany . |
| 63-77545 A | 4/1988 | Japan . |
| 6-262040 A | 9/1990 | Japan . |
| 2276332 A | 9/1994 | United Kingdom . |
| WO 96/23573 | 8/1996 | WIPO . |

Primary Examiner—Gary P. Straub
Assistant Examiner—Timothy C Vanoy
Attorney, Agent, or Firm—Ratner & Prestia

[57] ABSTRACT

An oxidation and/or combustion catalyst comprising at least one metal or oxide thereof chosen from the group consisting of palladium, platinum, nickel, cobalt and iron which is in combination with zinc metal or zinc metal oxide so as to result in a catalyst having said metal or oxide thereof to zinc metal or zinc metal oxide in a molar ratio of 1:2 and the catalyst is in the form of a close admixture or alloy, the catalyst further comprising a rare earth metal oxide.

8 Claims, 1 Drawing Sheet

OXIDATION AND/OR COMBUSTION CATALYST FOR USE IN A CATALYTIC EXHAUST SYSTEM AND PROCESS FOR ITS PREPARATION

This application is a national stage filing under 35 U.S.C. 371 of PCT/GB96/00239 filed Feb. 2, 1996.

This invention relates to a catalyst for oxidation and reduction reactions. In addition, the invention relates to a new catalytic composition.

Combustion catalysts include, for example the generic catalysts present in car exhaust systems and which reduce the output of nitrogen oxides ($NO_x$) and carbon monoxide (CO) gases as exhaust fume components which are discharged into the atmosphere. Conventionally such a car exhaust system consists of platinum together with rhodium. Whilst this catalyst is effective at converting nitrogen oxides and carbon monoxide to molecular nitrogen ($N_2$) and carbon dioxide ($CO_2$) platinum metal is expensive and thus increases the cost of the car exhaust catalyst manufacture.

Moreover the platinum/rhodium catalytic system does not become catalytically active until it reaches its characteristic "light off" temperature. Under laboratory conditions the light off temperature of the conventional Pt/Rh car catalyst is approximately 157° C. However, under practical conditions the light off temperature under normal operating criteria is in the region of 200–250° C. Increasing the temperature of the car catalyst to approximately 200–250° C. requires a warming period of approximately 8–10 minutes during which the catalyst is ineffective and the undesirable $NO_x$ and CO gases are released into the atmosphere. There is therefore strong motivation to produce a car exhaust catalyst system which has a lower light off temperature.

Another disadvantage of the conventional platinum/rhodium car catalyst system is that if misfiring of the engine occurs (in which unspent fuel is available for combustion inside the exhaust system), the temperature of the catalyst may be raised as high as 550–600° C. At these temperatures the conventional catalyst begins to deteriorate irreversibly.

One of the major research areas in vehicle exhaust catalysis is to develop a palladium based system as an alternative to the expensive platinum/rhodium system used in today's conventional car catalyst. However, to date major difficulties in achieving a palladium based catalyst to control vehicle exhaust emissions has been that the palladium metal is prone to reaction with oxygen at moderately high temperatures resulting in elution of the palladium metal from the catalyst washcoat, and also catalyst deactivation. Processes that invoke catalyst deactivation include 1) deposition of non-labile materials at the catalyst surface, 2) restructuring of the catalyst surface and in particular sintering of the supported metal function and 3) oxidation of the supported metal function through the chemical bonding of active species generated during the catalysis process. Deactivation of the catalyst through oxidation of the metal function renders a change in the metal character of the catalyst from its zero valent state to a localised state of positive charge.

UK Patent Application No. 9404802.2 discloses the use of a catalytic system for the catalysis of halogen replacement in halo-substituted hydrocarbons. The reaction catalyst is the removal of a halogen atom and its replacement by a hydrogen atom, and is therefore classified as an hydrogenation reaction.

It is known in chemistry that catalysts tend to catalyse only very specific reactions. In particular oxidation and hydrogenation reactions are viewed as being very different indeed.

Contrary to expectation, it has now been found that the catalyst disclosed in UK 9404802.2 is also effective in oxidation and combustion reactions.

The present invention therefore provides a catalyst for oxidation or combustion reactions, said catalyst comprising a catalytic metal selected from palladium, nickel, platinum, rhodium, silver, ruthenium, cobalt, iron, molybdenum and tungsten in combination with a material which is an electron donor or a precursor of an electron donor.

The function of the material is to stabilise the catalytic metal. Ideally the material should be able to stabilise the catalytic metal in it's zero oxidization state.

The material may be, for example, a metal or an oxide thereof. The metal content of the material may be different from the catalytic metal in the catalyst. Alternatively the material may be an organic moiety with the ability to donate electrons, for example a ligand or polymer with electron donating groups. Examples of suitable metals and metal oxides which may be used as the material of the invention include (but are not limited to) gallium, zinc, aluminium, gold, silver, platinum, nickel, mercury, cadmium, indium or thallium or the oxides of any of these metals.

In a preferred embodiment the catalyst comprises a metal plus zinc (for example palladium/zinc).

Desirably the material of the catalyst is zinc or zinc oxide.

Palladium in combination with zinc or zinc oxide is found to be especially effective in catalysing oxidation and combustion reactions.

The ratio of the catalytic metal:material may be varied as required. A ratio of 1:2 has been found to be satisfactory, however other ratios may also be useful and the optimisation of such ratios is mere routine.

The components of the catalyst may be in the form of an alloy or other close admixture, but other types of combination may also prove useful.

The presence of the material in the catalyst of the invention suppresses the catalytic system from oxidation or other reactions which would destroy the catalyst. Thus it has been found that the useful catalytic lifetime of the catalyst of the present invention is much greater than the lifetime of conventional combustion or oxidisation catalysts.

Without being bound by theory it appears that a synergistic relationship exists between metals forming the catalyst alloy whereby each metal component renders chemical stability upon the partner metal function.

Catalysts according to the present invention, especially a palladium-containing catalytic system, have been shown to exhibit lower light off temperatures than the convention catalysts.

Also by contrast to conventional platinum/rhodium car catalyst systems, a catalyst according to the present invention, especially a palladium-containing catalytic system, has been shown to exhibit catalytic activity after baking the catalyst in air at 600° C.

In further experimental work, it has been shown that in the Pd/ZnO catalyst of the present invention the ionisation energy of the palladium component is a mere 333.4 eV. This value compares very favourably with the 335 eV ionisation energy for conventional catalysts. Thus, in the catalyst of the present invention the catalytic metal (here, Pd) is able to ionise with greater ease as compared to the conventional catalyst. In addition it has been shown that the environment of the catalytic metal is highly homogenous and that a high level of intimacy with the material achieved.

The catalyst may be used according to the present invention to catalyse the combustion of hydrocarbon fuels, for example propane. In experiments involving propane/$O_2$ combustion reaction a Pd/ZnO catalyst was observed to lower the light off temperature required from the 290° C. of the conventional catalyst down to 180° C.

The present invention therefore provides a catalytic exhaust system for use in engines, said catalytic system comprising catalysts as defined above.

It has further been found that if the catalyst of the present invention (as described above) is combined with a rare earth oxide the combined system is particularly effective as an oxidation and combustion catalyst.

The present invention therefore provides a catalytic composition, said composition comprising a catalytic metal selected from palladium, nickel, platinum, rhodium, silver, ruthenium, cobalt, iron, molybdenum and tungsten in combination with a material displaying electron donating properties or a precursor of an electron donator (for example a transition metal or transition metal oxide, or aluminium or zinc, or the oxides thereof) and further comprising an oxide exhibiting variable stable oxidation states, for example the rare earth oxides.

Examples of suitable rare earth oxides therefore include oxides of La, Ce, Pr, Nd, Pn, Sm, Eu, Gd, Tb, Dy, Ho, Er, Tm, Yb and Lu. Desirably the rare earth metal should have at least two stable valences and mention may be made of the following metals in this regard: Ce, Pr, and Gd. In particular oxides of Pr are preferred as an additive in the catalytic composition of the present invention give enhanced oxidising and combusting catalytic ability.

In one particularly preferred example the catalytic composition of the present invention comprises a palladium/zinc oxide basic catalyst with a $PrO_x$ additive. The light off temperature of such a system has been found to be in the region of 100–120° C.

The present invention therefore provides a catalytic system for use in engine technology, said catalytic system comprising catalysts as defined above together with an oxide with stable variable valence states, for example an oxide of a rare earth metal.

During experimental investigations the exothermic reaction produced when the catalyst of the present invention reached its light off temperature caused a temperature increase of over 80° C. This exothermic reaction can be usefully harnessed to produce a sensor, the change in temperature due to the exothermic reaction at light off being detected by a thermoelectric interaction, for example by observing the change in resistance of the sensor itself or in the electrical connectors to the sensor following the increase in temperature.

Accordingly, the present invention provides a sensor to detect the presence of oxidisable or combustible matter, said sensor comprising a catalyst or a catalytic system as herein before defined.

In one embodiment the sensor arrangement comprises a Wheatstone bridge circuit having a sensor coated with the catalyst or catalytic composition balanced against a reference load. Preferably the reference load is identical in every aspect to the coated sensor apart from the absence of the catalyst in the coating. At the onset of the exothermic reaction a change in resistance of the sensor is indicative of the reaction taking place. The change in resistance of the sensor is itself detected, for example in a Wheatstone bridge circuit.

In a further aspect the present invention provides the use of the catalyst or catalytic composition as defined above in a sensor to detect oxidisable or combustible matter.

In one embodiment the sensor of the present invention can be used as a "sniffer" to provide information and a mechanism for a controlled feed-back on the efficiency of removal of noxious gases, for example from car exhaust fumes and other gas combustion equipment. The high exotherm liberated from the catalyst system can be usefully employed in fuel cell technology.

The present invention also provides a method for forming the catalyst of the present invention. The method involves placing the required quantities of the components into a crucible together with a quantity of de-ionised water and then baking the slurry into a cake. The cake is broken up into particulate form and is then calcined in oxygen. For example, calcination may occur at 250° C. for approximately 8 hours. The product is cooled to approximately 50° C. and hydrogen is passed over the product at that temperature for approximately 1 hour. The temperature is then slowly increased incrementally, for example the temperature is increased by approximately 50° C. each hour, with continual passing of hydrogen over the product. Once the temperature reaches approximately 237° C. the product can then be used as described above.

This the present invention provides a method for forming a catalyst as described above, characterised in that after calcination the temperature is lowered, hydrogen is passed over the reaction mixture and the temperature is then incrementally increased in the presence of hydrogen.

The process as described above is especially beneficial where the starting materials are palladium compound and a zinc compound. The end product formed by following the process described above is essentially a palladium zinc composition of strong metal character. Palladium acetate and zinc acetate are particularly suitable as starting materials. Instead of acetate one may also use the nitrate or any other compound (eg halogen) thereof. The palladium acetate and zinc acetate are intimately mixed, thermally degraded and then reduced as described above.

In any system of the present invention as described above, it may be beneficial to present the catalyst on a support. Any suitable support known in the art may be sufficient but particular mention may be made of zirconia or γ-alumina. Desirably the γ-alumina used has a low —OH content, for example Degussa '3 (TM) γ-alumina.

Preferably zirconia is used as a support. In a particularly preferred embodiment zirconia may be used as a support for a palladium/zinc oxide catalyst.

The conditions used in experimental work performed to date include a flow reactor, flow of 4000 hours$^{-1}$, on-line gas chromatography for analysis and thermal ramping of the temperature until light off is achieved.

BRIEF DESCRIPTION OF THE DRAWING

The accompanying drawing.

EXAMPLE 1

Figure 1:
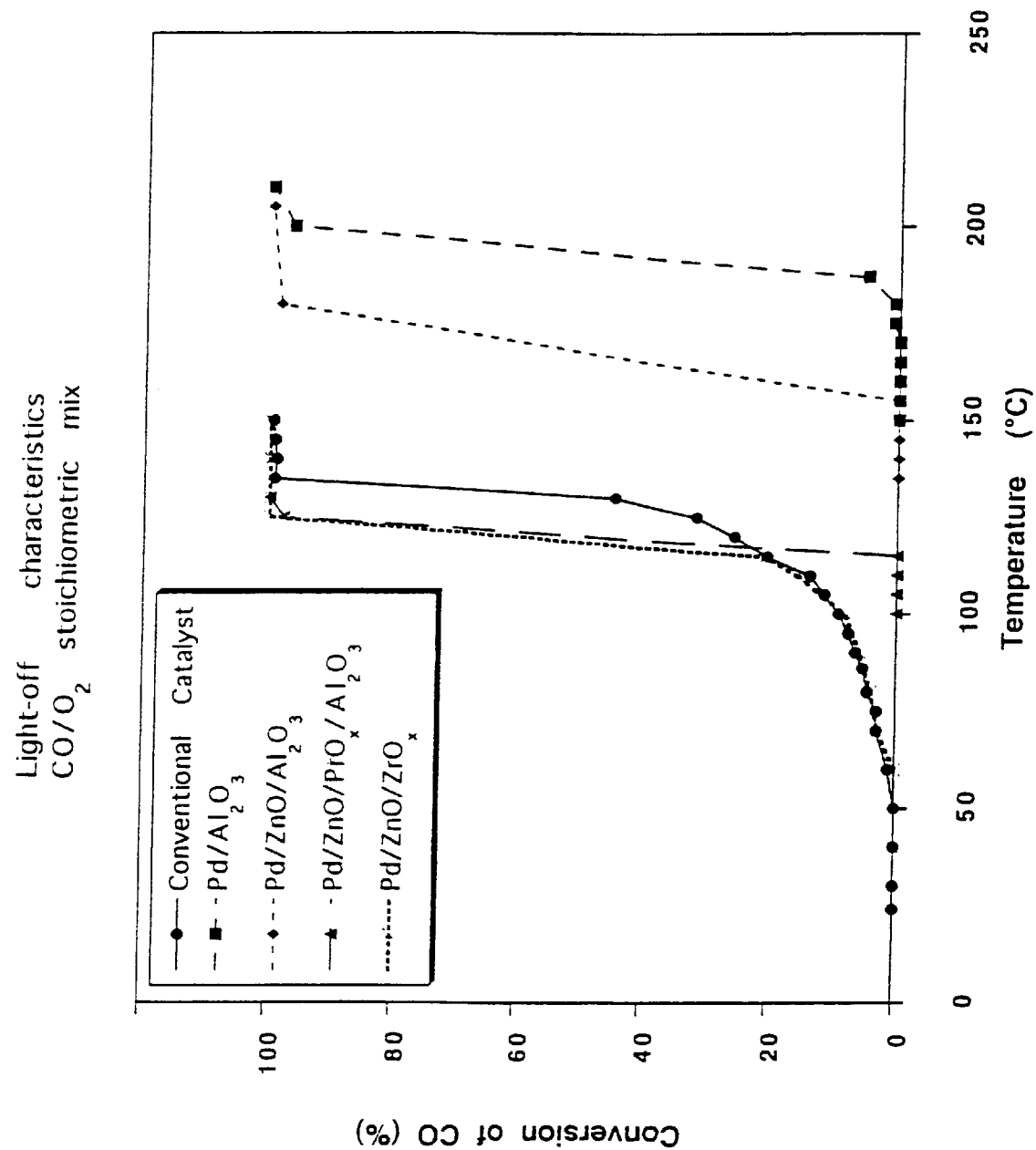
FIG. 1, shows light-off characteristics of a CO—$O_2$ stoichiometric mix using various catalysts.

Synergistic Effect in Palladium Zinc Oxide Catalyst

Studies of the catalytic properties of the Pd/ZnO/γ-alumina system towards carbon monoxide conversion and hydrocarbon combustion in the presence of neat dioxygen have indicated that the palladium and zinc appear to have a synergistic relationship, being stabilised even at high temperatures.

A palladium zinc catalyst on glass wool was heated to 140–180° C. in a reactor. Glass wool fusion was obtained indicating that the effective temperature on the combustion surface of the catalyst was 550–600° C., the catalyst was unaffected. It is known that palladium forms palladium oxide at 550° C. The catalytic composition therefore stabilised the palladium and zinc.

EXAMPLE 2

Stabilisation of Zinc Oxide by Ceria

Cerium stabilised zinc oxide having a surface area at 78 m$^2$/gram was fired at 1000° C. for 2 hours in air. The surface area after firing was 74 m$^2$/gram thereby indicating that the ceria had stabilised the zinc oxide.

EXAMPLE 3

Elemental Analysis of Palladium/Zinc Oxide Based Catalysts

The following table indicates the elemental energy positions of the catalysts as well as their respective ratios. ESCA measurements were performed using a VG HB100 Multilab system and AIKα monochromatic x-rays (1486 eV) were used to generate spectra.

| Catalyst No | Type | Preparation Details | Wt % Pd | Pd $3d_{5/2}$ (eV) | Zn $2p_{3/2}$ (eV) | Pd $3d_{5/2}$ / Zn $2p_{3/2}$ | Area % Pd (Pd + Zn) |
|---|---|---|---|---|---|---|---|
| 1 | Fresh | Pd | 5 | 335.5 | — | — | |
| 2 | Fresh | Zn$^1$ | — | — | 1024.4 | — | |
| 3 | Fresh | $^2$Pd/Zn$^{1a}$ | 5 | 335.2 | 1022.8 | 0.0289 | 2.78 |
| 4 | Worked (CO + O$_2$) | " | 5 | 335.4 | 1022.8 | 0.0356 | 3.44 |
| 5 | Worked (C$_3$H$_8$/O$_2$) | " | 5 | 335.3 | 1023.3 | 0.0407 | 3.91 |
| 6 | Fresh | $^2$Pd/Zn$^1$ | 5 | 335.2 | 1022.7 | 0.0320 | 3.11 |
| 7 | Deactivated | " | 5 | 337.0 | 1023.6 | 0.1006 | 9.14 |
| 8 | Fresh | $^{2a}$Pd/Zn$^{1a}$ | 1 | 335.4 | 1022.6 | 0.0390 | 3.81 |

$^1$12 m$^2$/g ZnO,
$^a$107 m$^2$/gZnO
$^2$Pd:ZnO ratio of 1:2,
$^a$1:10 ratio of Pd:ZnO Catalyst 4 was subjected to combusiton burning conditions and catalyst 5 was worked by burning in propane and oxygen which are ferocious burning conditions.

Catalyst Nos 1 and 2 acted as controls. The zinc component of the catalytic system for sample 2, (a fresh Zn O/γ-Al$_2$O$_3$ catalyst) appears at 1024.4 eV. This value indicates that the zinc is in oxidised form, since metallic zinc ionises at 1020.8 eV. For a freshly prepared Pd/ZnO/γ-Al$_2$O$_3$ catalyst (sample 3) the peak position of the zinc line shifts to 1022.8 eV thereby indicating the presence of zinc metal component in the catalyst formulation.

The ESCA results show that a freshly reduced Pd/ZnO/γ-Al$_2$O$_3$ catalyst renders the palladium function in an electron rich condition as evidenced by the ionisation peak at 335.2 eV (sample 3). This is in contrast to the fresh Pd/γ-Al$_2$O$_3$ catalyst sample which gives rise to a Pd 3d $_{5/2}$ peak at 335.5 eV. This state of slight enhancement of the electron density associated with the Pd environment can be attributed to the presence of the zinc metal component in the catalyst formulation. The ionisation energy obtained for the Zn2p $_{3/2}$ peak is at 1022.8 eV and confirms the high metal character associated with the surface Zn component.

As the catalyst sample 4 is worked under CO and O$_2$ the results generated from the ESCA analysis show that the ionisation energy of the Pd metal function moves towards that of the Pd metal position found in the fresh Pd/γ-Al$_2$O$_3$ (sample 1) at 335.4 eV. The Pd/Zn ratio has also increased from 0.0289 to 0.0356 confirming an enrichment of Pd at the catalyst surface. These results are consistent with an aggregation of Pd at the surface of the catalyst.

Working the Pd/ZnO/γ-Al$_2$O$_3$ catalyst for the combustion of propane in dioxygen results in an enhanced enrichment of the Pd at the surface relative to the carbon monoxide combustion in dioxygen. The zinc component of the worked Pd/ZnO/γ-Al$_2$O$_3$ system for the propane combustion process is in an oxidised form relative to that of the fresh and CO worked catalysts respectively.

The reaction of the catalyst under severe oxidising conditions during the hydrogenolysis of 1,1,2-trichlorotrifluroethane results in a surface where the Pd and Zn metal functions are segregated and the Pd is in an oxidised state as evidenced by the ionisation energy of 337.0 eV. Hence the catalytic reactions of oxidation and reduction on the Pd/ZnO/γ-Al$_2$O$_3$ system results in a separation process of Pd surface enrichment at the expense of bulk Pd depletion. These results are consistent with the peritectic phase diagram for a Pd/Zn alloy, where an alloy composition of 3% Pd precipitates the γ+Zn phase.

The palladium metal function has been found to be uniformly distributed over the γ-Al$_2$O$_3$ surface, with the zinc component in close proximity.

Catalyst operation results in an enrichment of the surface in Pd metal and a segregation of the Pd and Zn components and indicates that the segregation process is a precursor to the catalyst deactivation.

EXAMPLE 4

Preparation of a Monolith for Incorporation Into a Vehicle Exhaust System

A 10% weight sol containing 26.39 g gamma-alumina (Degussa) was impregnated with 2.22 g palladium nitrate, 3.66 g zinc nitrate and 4.19 g praseodymium nitrate.

The sol was digested at 110° C. over a period of 8 hours (ie to allow ions to impregnate alumina) prior to dipping dry monolith into the sol.

The monolith was dipped in sol, drained and baked at 120° C. for 8 hours prior to being incorporated into a vehicle exhaust system.

EXAMPLE 5

The palladium based vehicle exhaust formulation has been studied using a purpose built flow line which is able to control the flow of carbon monoxide (CO), dioxygen ($O_2$), nitrous oxide (NO), a hydrocarbon sample of propane (RH) and dinitrogen as the carrier gas.

These gasses can be reacted as required either as an individual reagent or part of a gas mixture at various predetermined partial pressures. The flow-line is fitted with in built gas sampling facilities linked to in-situ gas chromatographic analysis.

A conventional platinum/rhodium/ceria/γ-alumina vehicle exhaust monolith (Pt/Rh/$CeO_x$/γ-$Al_2O_3$) sample is used as a standard against which the activity of various catalyst formulations are measured. Gas weight hourly space velocities were maintained at 4000 $h^{-1}$ to give a bed residence time of ca 1 second.

Initial work required profiling the conversions of the respective gasses on the commercial catalyst monolith. Results from the conversion of CO in $O_2$ are shown in the attached FIG. 1. The results show that the commercial catalyst exhibits a slow increase to reaction ('light off') over the temperature range 60–130° C. before complete 'switch on' to the catalytic reaction where full conversion of the CO is achieved at 140° C. For this reaction to take place the catalyst system has to absorb the CO at the Pt metal environments and the $O_2$ at the $CeO_x$ function and hence the catalytic system has to operate efficiently in both these adsorption processes prior to combustion and desorption of carbon dioxide ($CO_2$) from the surface. The results for a Pd/γ-$Al_2O_3$ system are shown in FIG. 1. The results show that the combustion of CO on this catalyst surface is less efficient than the conventional catalyst by the relatively high temperature (190° C.) required to initiate the combustion process. However, the results show that the combustion process 'switches on' at this temperature, a profile which is dissimilar to that of the commercial system. We have also to bear in mind that the Pd/γ-$Al_2O_3$ system has no oxygen turnover component in the system at this stage.

The addition of zinc oxide to the catalyst formulation reduces the temperature to 'light off' for the Pd/ZnO/γ-$Al_2O_3$ system by ca 35° C. to 160° C. confirming that the modified catalyst is already displaying greater efficiency to CO conversion than the neat Pd/γ-$Al_2O_3$ catalyst. The results confirm that the surface has been modified to allow the reaction to proceed with a lower energy to activation. X-ray photoelectron spectroscopy (XPS) analysis confirms that the surface of the catalyst is an alloy of palladium and zinc with ca 14% of the surface composition being Pd. Again the results show that the system is able to 'switch on' to reaction unlike the reaction temperature profile observed from the commercial catalyst. This catalyst system was able to operate over a period of 72 h using a sample loading containing 20 mg Pd, demonstrating the high catalytic activity of the material. The Pd/ZnO/γ-$Al_2O_3$ sample does not contain any oxygen mobiliser, although the reduced metal component will display an affinity for oxygen. XPS analysis of the worked catalyst shown no elution of zinc metal from the catalyst over the duration of the reaction, confirming the thermal and chemical stability invoked on the catalyst by the combination of these two metal components in the catalyst formula.

Addition of praseodymium oxide ($PrO_x$) as an oxygen mobiliser to the Pd/Zn/γ-$Al_2O_3$ formula has a marked effect on the 'light-off' to combustion (FIG. 1). The 'light-off' temperature was measured at 120° C., and the reaction profile shows that the catalyst system 'switches on' at that temperature, to give complete combustion of CO.

This palladium based formula operates at a 'light-off' temperature below that of the commercial vehicle exhaust catalyst. The catalyst sample exhibits this high activity over a period of 72 h with no reduction in the conversion of CO. These results confirm the stability of the catalyst during the reaction with little or no deactivation owing to restructuring of the catalyst surface, or deposition of carbonaceous residue at the catalyst surface, or formation of inert metal environments through oxidation of the metal function. $PrO_x$ was chosen as the oxygen storage component owing to the similar redox characteristics to $CeO_x$ and avoiding prior art claims of the $CeO_x$ system.

Each of these four catalyst systems were monitored for their efficiency in converting RH for the commercial catalyst was ca 6% at a 'light-off' temperature of 185° C. Although the Pd/γ-$Al_2O_3$ system performed poorly during this reaction, the Pd/ZnO/γ-$Al_2O_3$ and the Pd/ZnO/$PrO_x$/γ-$Al_2O_3$ systems gave conversions of 55% in RH at 140° C. a conversion comparable with the commercial Pt/Rh/$CeO_x$/γ-$Al_2O_3$ system but at a temperature 45° C. lower. The lower temperature to activation of the catalyst is an important environmental feature, as there is pressure on the car manufacturers to reduce vehicle exhaust emissions. Since this catalyst formula 'switches on' at lower temperatures, therefore the catalyst will operate more quickly reducing emissions relative to the present commercial catalyst formulation. This characteristic is very important since many road users use their cars for short journeys in which the conventional catalyst has not attained the required temperature to commence the conversion processes. The operating temperature of the catalyst bed during hydrocarbon combustion was >550° C. as exemplified by the fusion of the glass wool plug which supports the catalyst bed in the reactor, to a glass bead. This indicates that the catalyst formulation is exhibiting good thermal stability. The Pd/ZnO/$PrO_x$/γ-$Al_2O_3$ system performed well under lean burn conditions, and in cases where the system was moved to rich burn deactivation of the catalyst was rapid. XPS analysis shows that the deactivation of the catalyst under rich burn conditions is owing to deposition of carbon at the metal and the $PrO_x$ function respectively.

In order to exemplify the role of zirconia in the Pd/ZnO system in vehicle exhaust sensor technology, MEL (Magnesium Electron and Light) supplied La doped zirconia for trials. A 5 wt % Pd/ZnO catalyst was prepared using the Melcat 680/01 (TM) zirconia (ZrO2) as a support material. The flow reactor was loaded with 0.5 g of catalyst (content 25 mg Pd). The reactor was operated under constant weight per hour space velocity (WHSV) conditions of 4000 $h^{-1}$. Variations in partial pressures of reactant gases were compensated using a balance of oxygen free nitrogen (OFN).

The Zirconia supported Pd/Zn catalyst exhibits activity towards the conversion of NO in the presence of CO. At a temperature of 125° C. the CO is converted to $CO_2$ (a temperature similar to the light-off of CO in $O_2$). At a reaction temperature of 150° C. both the CO and NO are converted to $CO_2$ and $N_2$ respectively. The second time through the light-off gave the temperature to reaction at 190° C. The results show that the Pd/ZnO/La.$ZrO_x$ system mimics closely the prelight off characteristics displayed by the conventional catalyst until the reactor temperature reached 125° C., where the catalyst 'switches on' to full combustion of the CO fraction. This temperature is ca 35° C. lower than that obtained from the conventional system. It is considered that this is the lowest theoretical temperature required for a "light off", particularly for hydrocarbons, since water is generated as a product, and the catalyst system has to operate at temperatures high enough to drive off any water produced as steam.

Propane combustion under lean burn conditions commences at 140° C. with low conversion around 5%. Under the reactor conditions used, the conversion factor was identical to that obtained from the conventional catalyst, however the "light-off" temperature was 45° C. lower. After around 4 h on line the conversion fell to 4% efficiency. Mixing CO with propane, dioxygen and dinitrogen over the catalyst gave a "light-off" temperature at 135° C. Conversion was around 33% for all gases. As the temperature was increased to >250° C. conversion fell until 300° C. conversion of all gases was recorded at 23%. Sequential passes through the light off temperature gave results:

| Run | Light-Off Temp ° C. | Conversion % |
|-----|---------------------|--------------|
| 2   | 160                 | 18           |
| 3   | 175                 | 27           |
| 4   | 185                 | 23           | followed by a constant conversion of 23% at 300° C.

Reducing the CO flow by 0.5 and increasing the propane flow by 2 increases the light-off temperature to 175° C. Conversion fell to 8% of gases, a result which is consistent with CO combustion dominating the catalysis.

Combining a 5 wt % Pd/ZnO/γ-alumina catalyst with a 0.7 wt % Pd/ZrOx catalyst and operating under identical addition of Rh/ZrO$_x$ to the system rendered the system less efficient that the Pd/ZnO/ZrO$_x$ system.

The most surprising results came from studies involving NO conversions. Using the Pd/ZnO/La.ZrO$_x$ catalyst with a feedstock of CO/NO, CO conversion to $CO_2$ at 125° C. was observed. As the reactor temperature was increased to 150° C. all of the CO and NO was converted to $CO_2$ and $N_2$ respectively. When the CO flow was halted the conversion of the NO to $N_2$ was terminated and reinstated with the delivery of CO feedstock to the reactor. These results confirm that the Pd/ZnO/La.ZrO$_x$ catalyst system does not require the use of the expensive component rhodium in the catalyst formulation and that the Pd/ZnO/ZrO$_x$ system is a candidate alternative catalyst system as a single phase, low cost catalyst for three way catalyst in vehicle exhaust catalysis.

We claim:

1. An oxidation and/or combustion catalyst comprising at least one metal or oxide thereof chosen from the group consisting of palladium, platinum, nickel, cobalt and iron which is in combination with zinc metal or zinc metal oxide, said catalyst having said metal or oxide thereof to zinc metal or zinc metal oxide in a molar ratio of 1:2 and the catalyst is in the form of a close admixture or alloy, the catalyst further comprising a rare earth metal oxide.

2. A catalyst as claimed in claim 1 supported on zirconia.

3. A catalyst as claimed in claim 1 supported on a rare earth metal stabilized zirconia.

4. A catalyst as claimed claim 1 supported on alumina.

5. A catalyst as claimed in claim 1 supported on rare earth metal impregnated alumina.

6. A process for manufacturing an oxidation and/or combustion catalyst comprising the steps of mixing salts of at least one metal from the group consisting of palladium, platinum, nickel, cobalt or iron, with a zinc salt and a rare earth metal oxide, thermally degrading and reducing the mixture by passing hydrogen over the mixture whilst increasing the temperature, said catalyst comprising at least one metal or oxide thereof chosen from the group consisting of palladium, platinum, nickel, cobalt and iron which is in combination with zinc metal or zinc metal oxide and said metal or oxide thereof to zinc metal or zinc metal oxide is in a molar ratio of 1:2.

7. A catalytic exhaust system which includes an oxidation and/or combustion catalyst comprising at least one metal or oxide thereof chosen from the group consisting at palladium, platinum, nickel, cobalt and iron which is in combination with zinc metal or zinc metal oxide, said catalyst having said metal or oxide thereof to zinc metal or zinc metal oxide in a molar ratio of 1:2 and the catalyst is in the form of a close admixture or alloy, the catalyst further comprising a rare earth metal oxide.

8. A method of oxidising and/or combusting a hydrocarbon fuel comprising the step of; contacting the fuel with a catalyst comprising at least one metal or oxide thereof chosen from the group consisting of palladium, platinum, nickel, cobalt and iron which is in combination with zinc metal or zinc metal oxide, said catalyst having said metal or oxide thereof to zinc metal or zinc metal oxide in a molar ratio of 1:2 and the catalyst is in the form of a close admixture or alloy, the catalyst further comprising a rare earth metal oxide.

* * * * *

UNITED STATES PATENT AND TRADE MARK OFFICE
CERTIFICATE OF CORRECTION

PATENT NO. : 5,899,678
DATED : May 4, 1999
INVENTOR(S) : Thomson et al.

It is certified that error appears in the above-identified patent and that said Letters Patent is hereby corrected as shown below:

Cover Page: item

[56] insert References Cited

FOREIGN PATENT DOCUMENTS

| | | |
|---|---|---|
| 0 397 411 A2 | 11/1990 | European Pat. Off. |
| 0 397 411 A3 | 11/1990 | European Pat. Off. |
| 0 449 423 A1 | 10/1991 | European Pat. Off. |
| 0 645 171 A1 | 03/1995 | European Pat. Off. |
| 63 77545 A | 04/1988 | Japan |
| 6 262040 A | 09/1990 | Japan |
| 2276332 A | 09/1994 | United Kingdom |
| 96/23573 | 08/1996 | WIPO |

Signed and Sealed this

Sixteenth Day of November, 1999

Attest:

Q. TODD DICKINSON

*Attesting Officer*     *Acting Commissioner of Patents and Trademarks*